United States Patent
Tomomatsu

(10) Patent No.: US 6,606,087 B1
(45) Date of Patent: Aug. 12, 2003

(54) COORDINATE READER

(75) Inventor: Yoshitsugu Tomomatsu, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 134 days.

(21) Appl. No.: 09/659,754

(22) Filed: Sep. 11, 2000

(30) Foreign Application Priority Data

Sep. 13, 1999 (JP) .......................................... 11-258339

(51) Int. Cl.$^7$ ................................................ G09G 5/00
(52) U.S. Cl. ....................... 345/174; 345/173; 345/179; 178/18.07; 178/19.03
(58) Field of Search ................................. 345/173, 174, 345/179, 156, 157, 901; 178/18.01, 18.02, 18.03, 18.07, 18.08, 18.1, 19.03, 20.01

(56) References Cited

U.S. PATENT DOCUMENTS

| | | | |
|---|---|---|---|
| 4,988,837 A | * | 1/1991 | Murakami et al. ........... 345/173 |
| RE33,740 E | * | 11/1991 | Taguchi et al. ............. 345/173 |
| 6,249,234 B1 | * | 6/2001 | Ely et al. ................. 178/18.07 |

FOREIGN PATENT DOCUMENTS

| | | |
|---|---|---|
| JP | 59-14042 | 1/1984 |
| JP | 60-29997 | 7/1985 |

* cited by examiner

Primary Examiner—Xiao Wu
(74) Attorney, Agent, or Firm—Oliff & Berridge, PLC

(57) ABSTRACT

A coordinate reader includes a base member having a plurality of X-loop wires provided in a first surface of the base member, a plurality of Y-loop wires provided in a second surface of the base member, a first input plane provided over the plurality of X-coils and a second input plane provided over the plurality of Y-loop coils. When a coordinate input device generates an alternating magnetic field for inputting its coordinates into the coordinate reader, the coordinate reader detects signals generated on the X-loop wires and the Y-loop wires in response to the alternating magnetic field. Then, the coordinate reader determines, based on the detected signals, which of the first input plane or the second input plane the coordinate input device is placed on, and the coordinates of the coordinate input device on the first input plane or the second input plane.

20 Claims, 18 Drawing Sheets

58A

| ΔX | DIFF |
|---|---|
| 0 | 162 |
| 1 | 148 |
| 2 | 136 |
| 3 | 125 |
| : | : |
| 12.5 | 0 |

58B

| ΔX | DIFF |
|---|---|
| 0 | 81 |
| 1 | 74 |
| 2 | 68 |
| 3 | 62 |
| : | : |
| 12.5 | 0 |

RAM 59

| POSITIONAL COORDINATE TABLE | 58 |
| --- | --- |
| TEMPORARY MEMORY | 59 |
| FRONT COORDINATE MEMORY | 59 |
| BACK COORDINATE MEMORY | 59 |
| ⋮ | |

TEMPORARY MEMORY 59

| COIL NUMBER | DETECTION VALUE |
| --- | --- |
| X 1 | 0 |
| X 2 | 0 |
| X 3 | 2 6 |
| X 4 | 1 0 2 |
| X 5 | 1 2 8 |
| X 6 | 1 2 8 |
| X 7 | 1 0 2 |
| X 8 | 2 6 |
| X 9 | 0 |
| ⋮ | ⋮ |
| Xm | 0 |

COORDINATE READER

BACKGROUND OF THE INVENTION

1. Field of the Invention

The invention relates to a coordinate reader. The coordinate reader comprises a coordinate input plate formed with coordinate input planes on both sides of the coordinate input plate which electrically reads X- and Y-coordinates of a coordinate input device on the coordinate input plate.

2. Description of the Prior Art

Japanese Laid-Open Patent Publication No. 59-14042 discloses a conventional coordinate reader, as illustrated in FIGS. 18A and 18B. FIGS. 18A and 18B illustrate a board B when coordinate input sheets B1 and B2 are in use, respectively. The board B is rotatable on a shaft AX, and has connectors CN1 and CN2 at a top and a bottom end thereof. Located within the board B are coils arrayed in the x-axis and y-axis for sensing coordinates (X, Y) of a stylus on the board B. The board B also has a connector CN that is connected to either the connector CN1 or CN2, and a control circuit CONT. As shown in FIG. 18A, the connector CN is connected with the connector CN1 when the sheet B1 is in use. The control circuit CONT recognizes that the sheet B1 is in use based on the output signal from the connector CN. In the same way, the connector CN is connected with the connector CN2, as shown in FIG. 18B, when the sheet B2 is in use. The control circuit CONT recognizes that the sheet B2 is in use based on the output signal from the connector CN. Then, the coordinates (X, Y) of the stylus are detected upon the output signal from the connector CN.

Japanese Patent Publication No. 60-29997 discloses another type of conventional coordinate reader. A board of the coordinate reader has input sheets on both sides of the board, and is rotatable on a shaft. The shaft is electrically connected to a bearing with a switching mechanism, thereby detecting the input sheet in use and detecting coordinates (X, Y) of a stylus.

As described above, the conventional coordinate readers use mechanical switches to recognize which of the coordinate input sheets is in use and to detect the coordinates (X, Y) of the stylus. However, when the contact of the mechanical switch is poor, the coordinate reader cannot recognize which coordinate input sheet is in use or sense the coordinates (X, Y) of the stylus.

SUMMARY OF THE INVENTION

In various exemplary embodiments of a coordinate reader that detects coordinates designated by alternating a magnetic field, the coordinate reader includes a base member with a plurality of first loop wires provided in a first surface of the base member, the first loop wires generating first signals in response to the alternating magnetic field induced from the coordinate input device, second loop wires provided in a second surface of the base member, the second loop wires generating second signals in response to the alternating magnetic field induced from the coordinate input device, a first input plane provided over the plurality of first loop wires; and a second input plane provided over the plurality of second loop wires; a signal detection unit that detects the first and the second signals; an input plane determination device that determines which of the first input plane or the second input plane the coordinate input device is placed on by using at least one of the first and the second signals; and a coordinate determination unit that determines first coordinates and second coordinates of the coordinate input device based on the detected first and second signals, respectively.

The strength of the magnetic field generated from the coordinate input device becomes lower with distance therefrom. The nearer the loop wires are to the coordinate input device, the larger the signals generated and detected on those loop wires. Therefore, the input plane determination unit can determine which of the first and second input planes the coordinate input device is placed on by using at least one of the detected signals and comparing the signal levels. Thus, the reliability of the coordinate reader in detecting the location of the coordinate input device and of sensing the coordinates of the coordinate input device is increased without the use of mechanical switches as found in conventional coordinate readers.

Further, the signal detection unit of the coordinate reader may comprise a first signal level detector that detects a first signal level and a second signal level detector that detects a second signal level, the first signal level being the levels of the signals that are generated on adjacent two first loop wires among the plurality of the first loop wires that are substantially equivalent, the second signal level being the levels of the signals that are generated on adjacent two second loop wires among the plurality of the second loop wires that are substantially equivalent.

The detected signal level varies depending on a position over the loop wires. In other words, the maximum signal level is detected at the center line of each of the loop wires, and the detected signal level becomes weaker as the position moves away from the center line of the loop wires. If the signal levels of different conditions are compared, the input plane determination device and the coordinate input plane will not determine the location of the coordinate input device. Hence, the input plane determination device determines which of the first input plane or the second input plane the coordinate input device is placed on by using at least one of the first signal level and the second signal level, thereby comparing the signal levels of the same condition to determine the location of the coordinate input device.

The coordinate reader may further comprise a correction unit that corrects at least one of the first coordinate and the second coordinate, upon the determination of the input plane by the input plane determination unit.

As mentioned above, the base member has the first and the second input planes. When the base member is turned over to an input plane after another input plane, the orientation of one of the first and the second loop wires is reversed. This causes the coordinate determination unit to determine the coordinate reversely. The coordinate corrector corrects and controls the coordinate determination unit to determine the coordinates accurately, without being reversed.

BRIEF DESCRIPTION OF THE DRAWINGS

Various exemplary embodiments of this invention will be described in detail, with reference to the following figures, wherein.

DETAILED DESCRIPTION OF THE INVENTION

Figure 1:
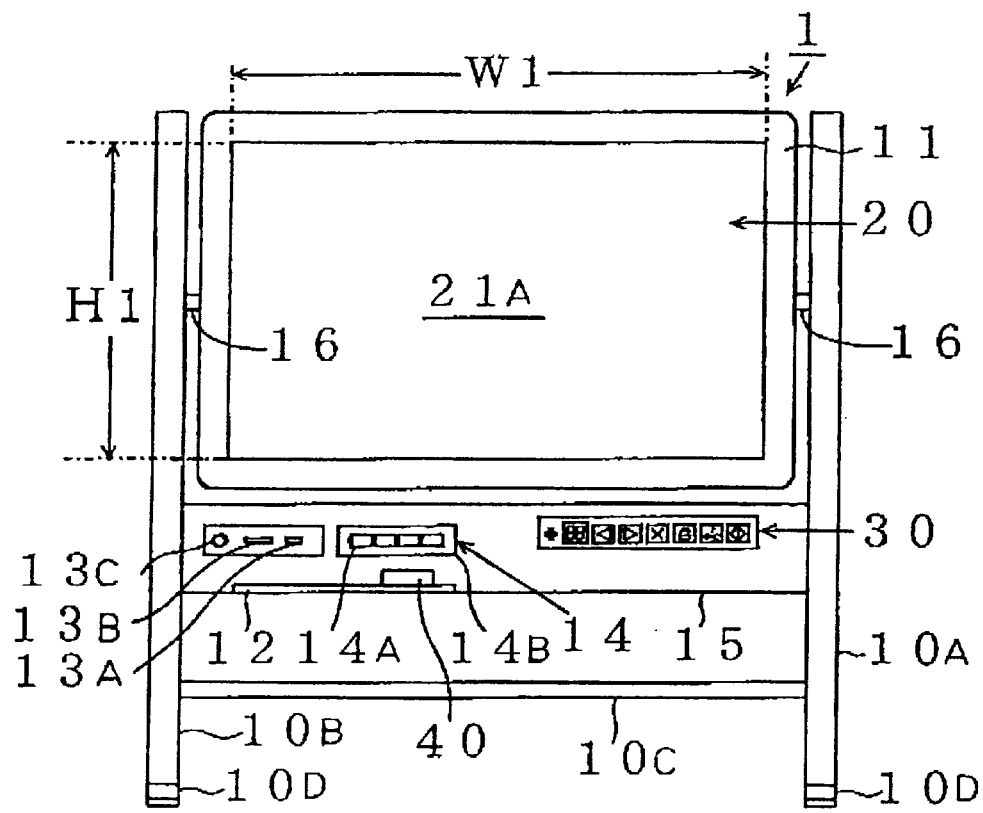
FIG. 1A is a front view of a tablet according to a first embodiment of the invention.
FIG. 1B is a schematic illustration of an operating portion of the tablet of FIG. 1A.
FIG. 1C schematically shows a stylus for the use of the tablet of FIG. 1A.
FIG. 1D schematically shows an eraser for the use of the tablet of FIG. 1A.
Figure 1:
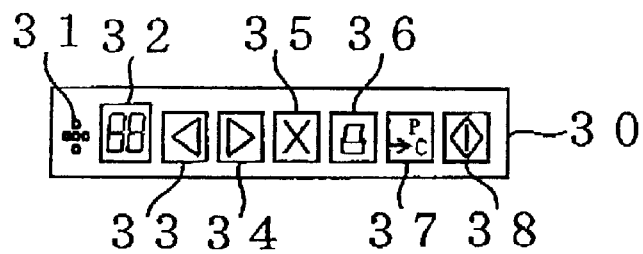
Figure 1:
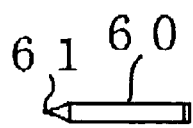
Figure 1:
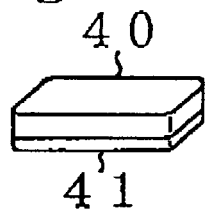
Figure 2:
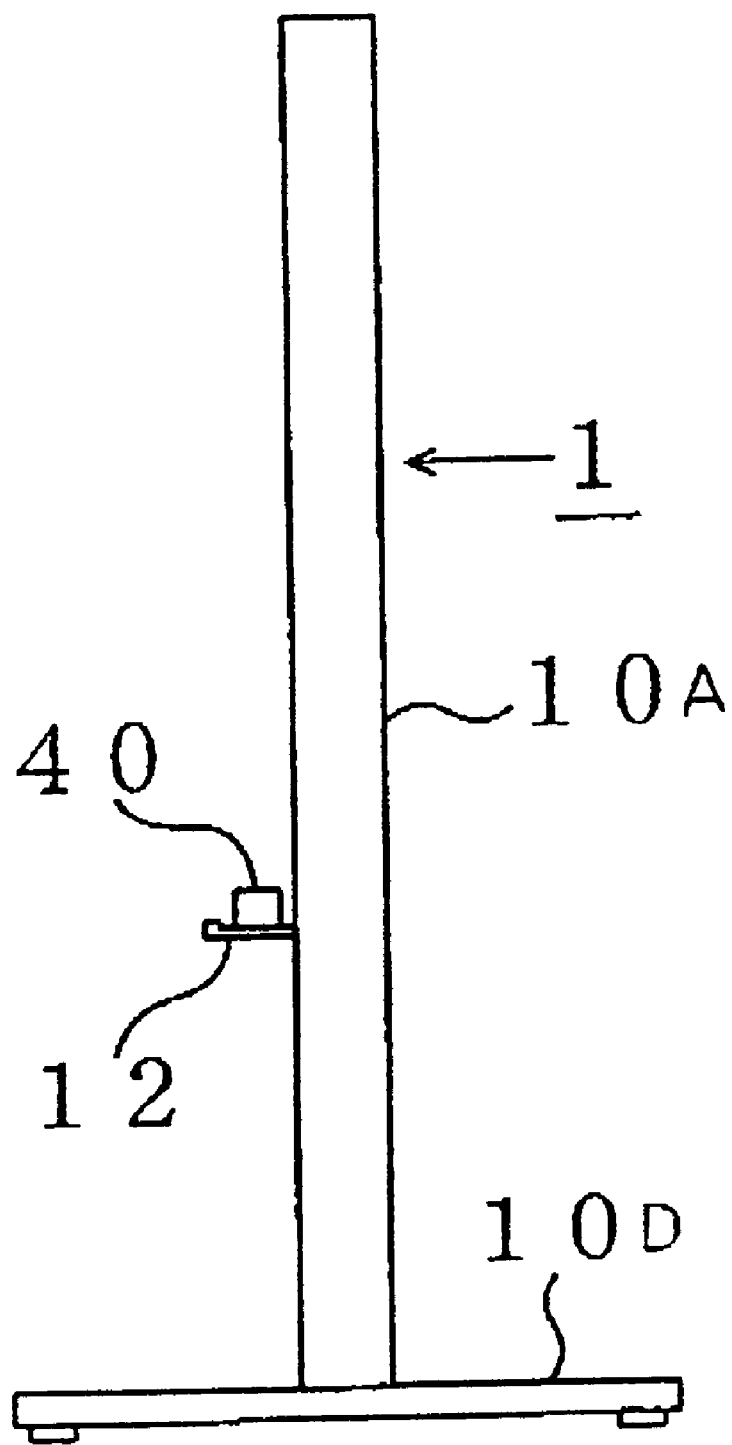
FIG. 2 is a right side view of the tablet of FIG. 1A.
Figure 3:
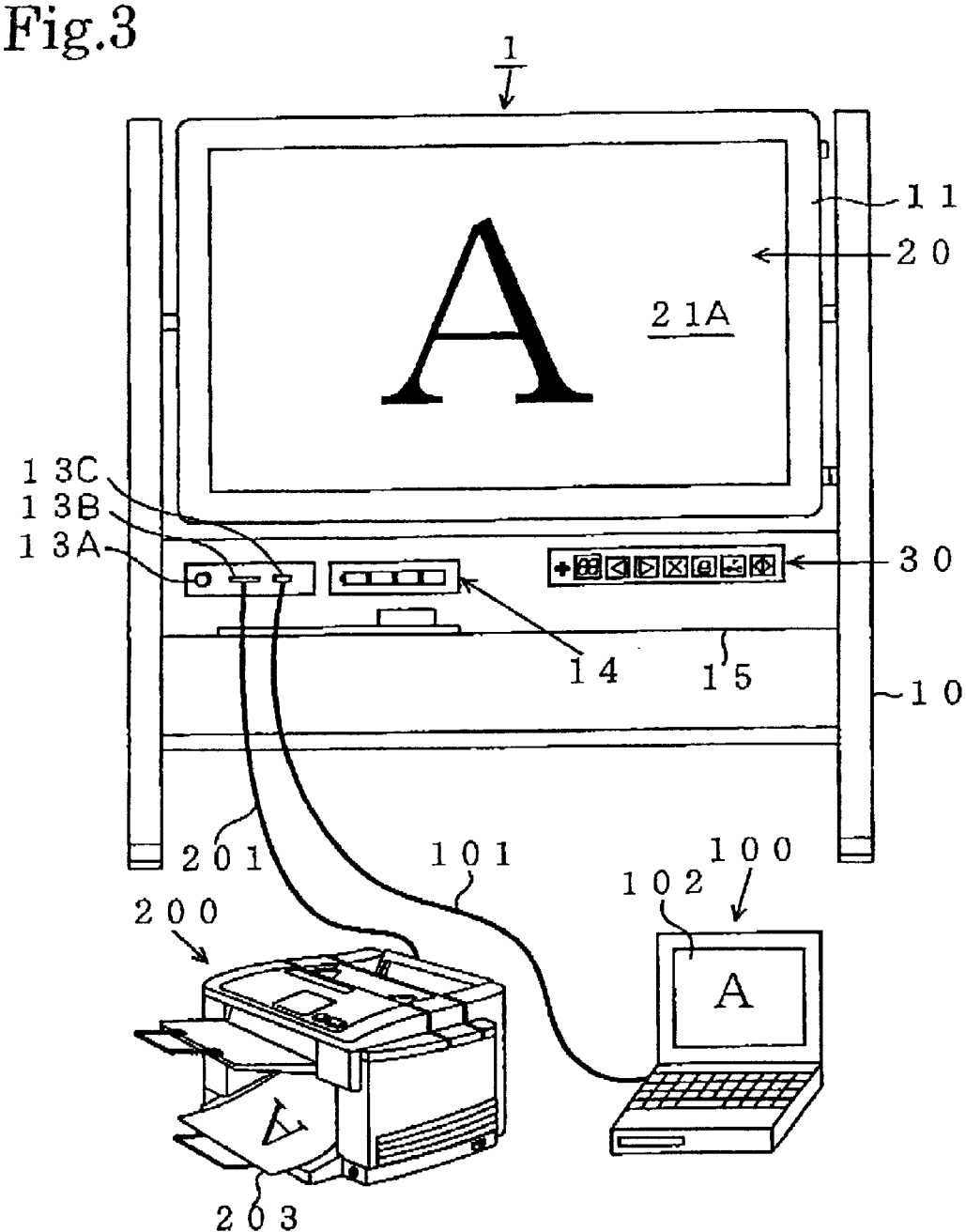
FIG. 3 illustrates the tablet of FIG. 1A connected to a PC and to a printer.

An explanation will be given of a coordinate reader in accordance with the invention based on the following exemplary embodiments. Herein, the exemplary embodiments refer to a tablet that electrically reads images drawn by a stylus on an input panel and stores data of the read images therein FIG. 1A is a front view of a tablet 1 of a first exemplary embodiment, FIG. 1B is a schematic illustration of an operating portion 30 of the tablet 1, and FIGS. 1C and 1D respectively shows a stylus 60 and an eraser 40 used for the tablet 1. FIG. 2 is a right side view of the tablet 1. FIG. 3 illustrates the tablet 1 connected to a PC 100 and to a printer 200.

The tablet 1 comprises an input panel 20 having input planes 21A, 21B (FIG. 5) on both sides of the input panel 20, the stylus 60 (FIG. 1C) for inputting images, such as characters and drawings, on the input planes 21A, 21B and for allowing the tablet 1 to store data indicative of the images (hereinafter referred to as input data), and the eraser 40 for deleting the images input by the stylus 60 and the input data. The input panel 20 is set in a frame 11, and is supported by columns 10A, 10B so as to be rotatable on shafts 16. The tablet 1 also has a plate 15 and a reinforcing rod 10C beneath the input panel 20 between the columns 10A, 10B. The columns 10A, 10B are supported on feet 10D.

As shown in FIG. 1B, the operating portion 30 is provided on the plate 15 with a speaker 31, a LED page display 32, a page back button 33, a page feed button 34, a delete button 35, a print button 36, a PC output button 37, and a power button 38. The speaker 31 reproduces various sounds (for example, a warning beep and an operation sound) based on audio signals from an audio circuit 31A (shown in FIG. 10). The LED page display 32 is constructed of a seven-segmented LED and indicates the number of pages where the input data on the input plane 21A or 21B is stored. The page back button 33 and the page feed button 34 are for paging up and paging down by a page at the push thereof, respectively. The delete button 35 is for erasing one page's worth of input data by a page at the push thereof. The print button 36 and the PC output button 37 are for outputting the input data to the printer 200 and to the PC 100, respectively, at the push thereof. The power button 38 is for energizing and de-energizing the tablet 1. A battery case 14 is provided with a lid 14B in the plate 15, for housing four C batteries 14A therein as a power source of the tablet 1. The lid 14B is openably and closably attached to the front surface of the battery case 14. Connectors 13A and 13B are provided on the plate 15 to be connected to the PC 100 and the printer 200, respectively, with connector cables 101, 201. The input data may be output to the PC 100 to be read on a monitor 102 of the PC 100, or may be output to the printer 200 to be printed on a paper 203. There are further provided a volume controller 13C for adjusting the volume of the speaker 31, and a tray 12 that holds the stylus 60 and/or the eraser 40.

The stylus 60 comprises therein a nib 61 from which ink is released, an exchangeable ink cartridge that supplies the nib 61 with ink, a coil that generates an alternating magnetic field for inputting the input data, an oscillation circuit for oscillating the coil to generate the alternating magnetic field, and a battery as a power source of the stylus 60. The eraser 40 has a wiping cloth 41, at its bottom, that wipes the ink on the input planes 21A, 21B, and a coil therein that generates alternating magnetic field for erasing the input data, an oscillation circuit for oscillating the coil to generate the alternating magnetic field, and a battery as a power source of the eraser 40.

In this embodiment, each of the input planes 21A, 21B is 600 mm long (H1) and 900 mm wide (W1). The frame 11 is made of synthetic resin, such as polypropylene, so as to be lightweight.

Figure 4:
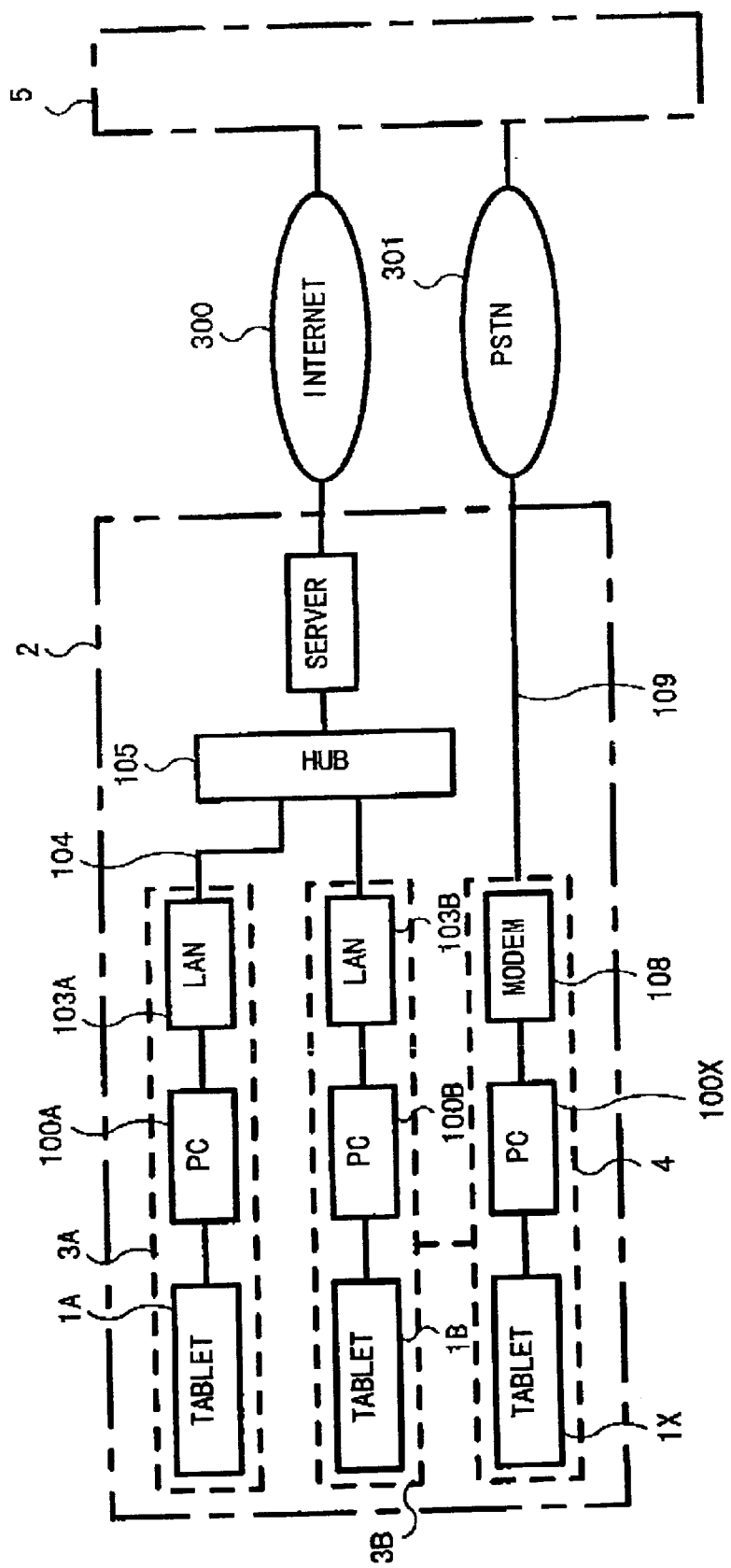
FIG. 4 is a block diagram of a network of tablets for data communication.

FIG. 4 is a block diagram of a network composed of tablets. As illustrated in FIG. 4, data communication can be performed within the network of tablets. For illustrative purposes only, the data communication is performed between a plurality of different rooms in a same company, or between different companies within the network of the tablet. However, it should be appreciated that any network can be used to connect a plurality of tablets.

Rooms 3A and 3B of a company 2 are equipped with tablets 1A and 1B, PCs 100A, 100B, and LAN boards 103A, 103B, respectively. A room 4 of the company 2 is equipped with a tablet 1X, a PC 100X, and a modem 108. Each of the LAN boards 103A, 103B provided in the rooms 3A, 3B is connected to a HUB 105 with LAN cables 104. The HUB 105 is further connected to a server 106 capable of accessing to another company 5 via the Internet 300 through internet cable 107. The modem 108 in the room 4 is connected to the company 5 through a telephone line 109 and a public switched telephone network (PSTN) 301. The company 5 also has a tablet capable of communicating through a PC 100Y as found in company 2.

Data communication can be performed within the network of tablets. For example, the input data stored in the tablet 1A can be transmitted from the PC 100A to the PC 100B through the LAN boards 103A, 103B and the HUB 105. The data may be displayed on a monitor that is connected to the PC 100B, or may be output to a printer that is connected to the PC 100B. The input data can also be transmitted to the company 5 via Internet 300, being attached to an e-mail as an image file formatted in Tag Image File Format (TIFF). The image file is decoded in the company 5 in order to read the transmitted data.

Figure 5:
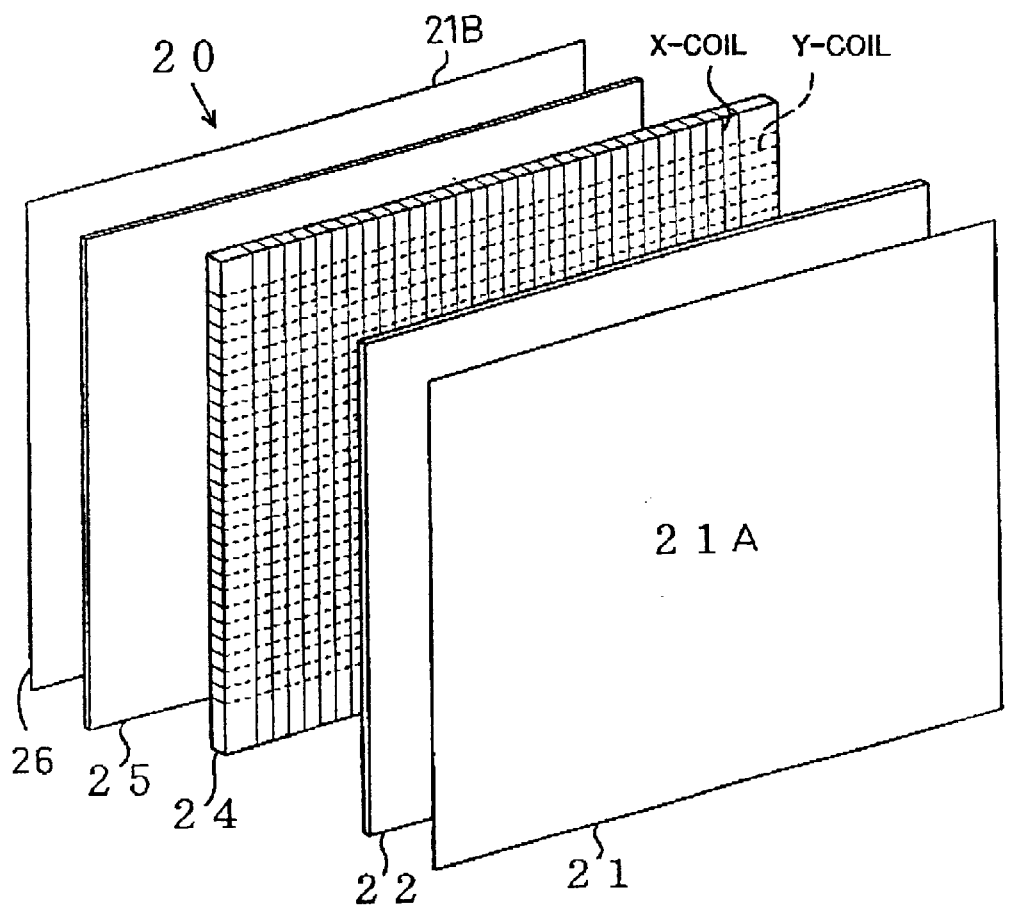
FIG. 5 is an exploded view of an input panel of the tablet of FIG. 1A.

FIG. 5 is an exploded view of the input panel 20.

The input panel 20 comprises input sheets 21, 26 having input planes 21A, 21B respectively, plate panels 22, 25, and an attachment panel 24. The attachment panel 24 includes sense coils arranged in an X-coordinate direction (hereinafter referred to as X-coils) on its one surface facing toward the input plane 21A, and sense coils arranged in a Y-coordinate direction (hereinafter referred to as Y-coils) on its another surface facing toward the input plane 21B, as illustrated in FIG. 5.

In this exemplary embodiment, both of the input sheets 21, 26 are made of a PET (polyethylene terephthalate) film of a thickness of 0.1 mm. The plate panels 22, 25 are made of, for instance, acrylic resin or ABS (acrylonitrile-butadiene-styrene resin) or PC (polycarbonate), to be 3.0 mm thick. The attachment panel 24 is made of foam, such as styrofoam, to be 5 mm thick. The input panel 20 is lightweight as the attachment panel 24, provided at the core of the input panel 20, is formed of a lightweight material.

FIG. 6A schematically illustrates X-coils and Y-coils of FIG. 5, and FIG. 6B is and explanation drawing a width of the X-coil and an overlapping pitch between the X-coils.

As shown in FIG. 6A, the Xi-coils (i=1, 2, 3 . . . , m) are arranged in the X-coordinate direction for sensing X-coordinates of the stylus 60. The Yi-coils (i=1, 2, 3, . . . , n) are arranged in the Y-coordinate direction perpendicular to the X-coordinate direction for sensing Y-coordinates of the stylus 60. Each of the Xi- and Yi-coils is toroidal, and form a rectangular shape with a width P1 and a length P2. As shown in FIG. 6B, the X-coils are overlapped one another with a pitch P1/2. In the same way, the Y-coils, each having the width P1, overlapped each other with a pitch P1/2. Each X-coil and each Y-coil has a pair of terminals 23A, 23B connected to a X-coil switching circuit 50A and a Y-coil switching circuit 50B, respectively.

In this embodiment, there are provided 23 X-coils (m=23) and 34 Y-coils (n=34), each coil being 50 mm wide (P1=50 mm) and 900 mm long (P2=900 mm). Further, the X-coils and the Y-coils are made of copper wire that has a 0.35 mm diameter and is covered with an insulating layer, such as an enamel layer.

Herein, the coils are drawn in FIG. 6A for clarity and simplicity, so that the sides of the X- and Y-coils are shifted from one another. In practice, the longitudinal side of the X-coil X1, for example, overlaps the short sides of the Y-coils Y1, Y2, Y3, . . . , Yn. Further, each pair of the terminal elements 23A, 23B are formed so as to have a minimal space therebetween.

FIG. 7A is a partially expanded view of the X-coils X1, X2 and X3. FIG. 7B shows voltages generated on the X-coils, X1, X2 and X3 relative to a distance in a width direction of the X-coil. FIG. 7C is a plot of voltage difference between the adjacent two coils among X1, X2 and X3. FIG. 8A is a plot of 8-bit digital data indicative of the voltage difference between the adjacent two coils. FIG. 8B schematically shows a positional coordinate table 58A, and FIG. 8C is a corrected positional coordinate table 58B. It is now assumed that the stylus 60 is placed on the input plane 21A. Further, as illustrated in FIG. 7A, center lines of the X-coils X1, X2 and X3 that extend along the Y-coordinate direction are called C1, C2 and C3, respectively.

The X-coils X1, X2 and X3 indicate voltages ex1, ex2, and ex3, respectively, as shown in FIG. 7B, when the stylus 60 is located at some place near the X-coils X1 to X3. Each of the voltage ex1, ex2 and ex3 indicates a single-peaked pattern, being maximum on the center lines C1, C2 and C3 and becoming zero beyond the center lines of the adjacent coils. The point at zero is referred to as a null point. Herein, the width P1 of the coil may be broadened as long as the voltage on the coil indicates a single-peaked pattern. The overlapping pitch may be lessened to less than a half of the width P1 as long as the voltage has the null points beyond the center lines of the adjacent coils.

As shown in FIG. 7C, the voltage differences between the adjacent two coils are respectively at the maximum on the center lines C1 to C3, and are respectively zero at the midpoint between the center lines of the adjacent coils. The midpoint corresponds to a point located at a midpoint of the overlapping area between the longitudinal sides of the adjacent coils.

For example, the voltage difference (ex1−ex2) is shown in a solid line of FIG. 7C, relative to the distance between from the center line C1 to the midpoint Q1 located midway between the longitudinal sides of the coils X1 and X2. The distance between C1 and Q1 corresponds to a half length of the overlapping pitch P1/4 (P1/4=12.5 mm in this embodiment). The voltage difference (ex1−ex2) in a solid line of FIG. 7C is converted into 8-bit digital data and plotted as shown in a solid line of FIG. 8A. This plot is presented in a tabular form as the positional coordinate table 58A shown in FIG. 8B. The positional coordinate table 58A is stored in the ROM 58 or other memory media to be used for calculating coordinates of the stylus 60.

Accordingly, if the stylus 60 is located at a point Q2, the voltage difference (ex1−ex2) is detected and converted into digital data. The distance ΔX1 from C1 is determined, upon the conversion of the voltage difference (ex1−ex2) into digital data, by referring to the coordinate table 58A. As a result, the X-coordinate of Q2 is positioned being ΔX1 apart from C1.

As indicated by the solid line of FIG. 7C, in the area between the center line C1 and the midpoint Q1, the characteristic in FIG. 8A shows the relationship between the voltage difference (ex1−ex2) and the distance from the center line C1 in a positive direction along the X-coordinates. However, as indicated by a dotted line of FIG. 7C, in another area between the center line C2 and the midpoint Q1, the similar characteristic of FIG. 8A shows the relationship between the voltage difference (ex2−ex1) and the distance from the center line Q2 in a negative direction along the X-coordinates.

Therefore, in the area from the center line Ci of each X-coil Xi (where $1 \leq i \leq -1$) to the middle line Qi between the center line Ci and the center line Ci+1 of its adjacent X-coil Xi+1, the characteristic of FIG. 8A represents the relationship between the voltage difference (exi−exi+1) and the stylus location $\Delta X$ that is defined from the center line Ci of the X-coil Xi in the positive direction along the X-coordinate. Contrarily, in the area from the middle line Q1 to the center line Ci+1, the similar characteristics of FIG. 8A represents the relationship between the voltage difference (exi+1−exi) and the stylus location $\Delta X$ defined from the center line Ci+1 in the negative direction along the X-coordinates.

FIG. 8A shows a plot of 8-bit digital data in a dotted line, indicative of the voltage difference between the Y-coils, when the stylus 60 is placed on the input plane 21A. In this condition, the Y-coils are positioned far from the stylus 60. The detected voltages are relatively smaller on the Y-coils than on the X-coils, because the strength of the alternating magnetic field is smaller on the Y-coils than on the X-coils. Thus, the voltage differences are smaller between the adjacent two Y-coils than between the adjacent two X-coils, as shown in FIG. 8A. The plot in the dotted line is also presented in a tabular form as the other positional coordinate table (not shown in the drawings), and stored in the ROM 58 or secondary memory media. The Y-coordinate is determined in the same manner, by using the second positional coordinate table.

Figure 9:
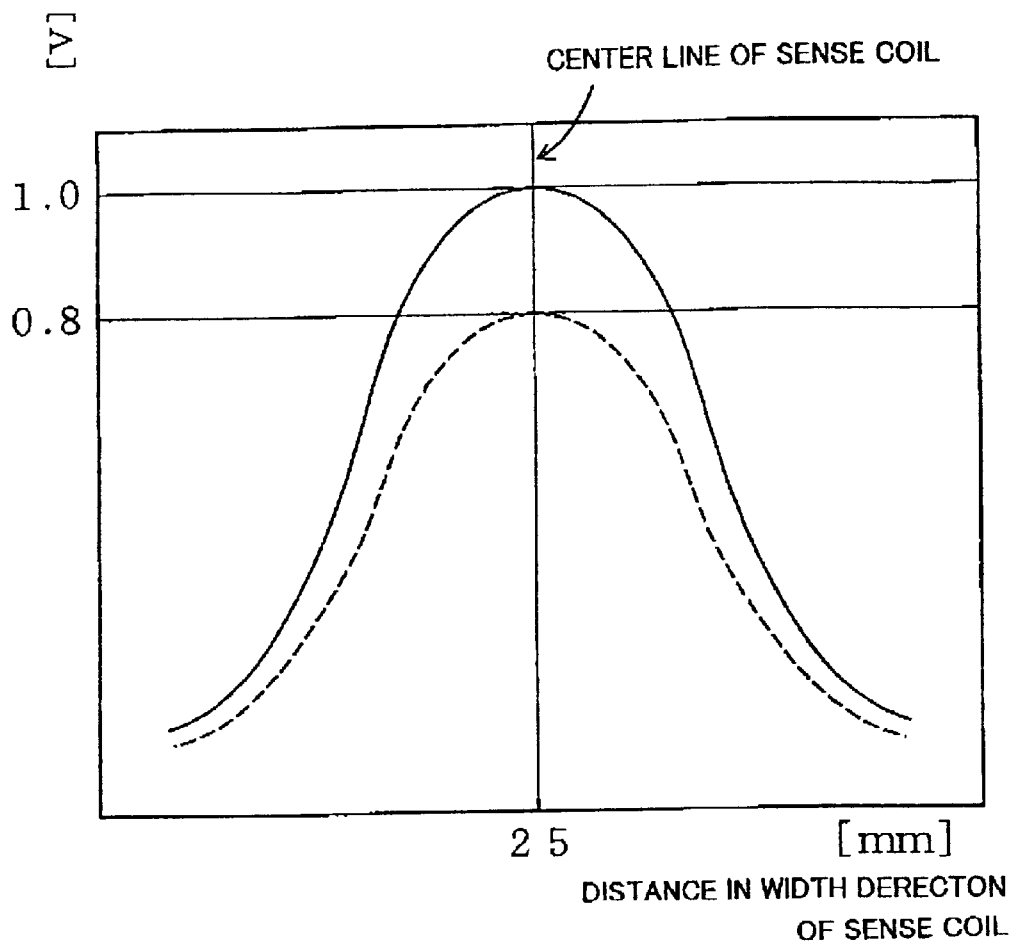
FIG. 9 indicates the detected voltages detected on the X- and the Y-coils.

FIG. 9 shows the voltages detected on the X-coils and the Y-coils in a solid line and in a dotted line, respectively, when the stylus 60 is placed on the input plate 21A. (In other words, the X-coils are on the surface of the input plane 21A facing toward the stylus 60.) Herein, the stylus 60 includes a ferrite coil of which output frequency is 400 kHz, and is held in a vertical position (at an angle of 90 degrees) against the input plane 21A. The ferrite coil is at a distance of 20 mm from the input plane 21A. Each of the X- and Y-coils is 50 mm (P1=50 mm).

There is a voltage difference of 0.2 V at maximum between the voltages detected on the X-coils and the Y-coils, due to the distance from the stylus 60. As mentioned above, this is because that the strength of the alternating magnetic field becomes lower, (that is, the detected voltage becomes small) with distance from the stylus 60. It is difficult to determine both the X- and the Y-coordinates of the stylus 60 accurately using a single positional coordinate table. Thus, there are provided two different positional coordinate tables: front coordinate table for sensing coordinates by the coils facing toward the stylus 60, and a back coordinate table for sensing coordinates by the coils on the input plane far from the stylus 60. As above, the positional coordinate table 58A corresponds to the front coordinate table, the second positional coordinate table 58B corresponds to the back coordinate table. In this embodiment, a single front coordinate table and a single back coordinate table are provided, and each of the front and the back coordinate table is used for determining X- or Y-coordinates depending on which of the input plane the stylus 60 is placed on.

Figure 10:
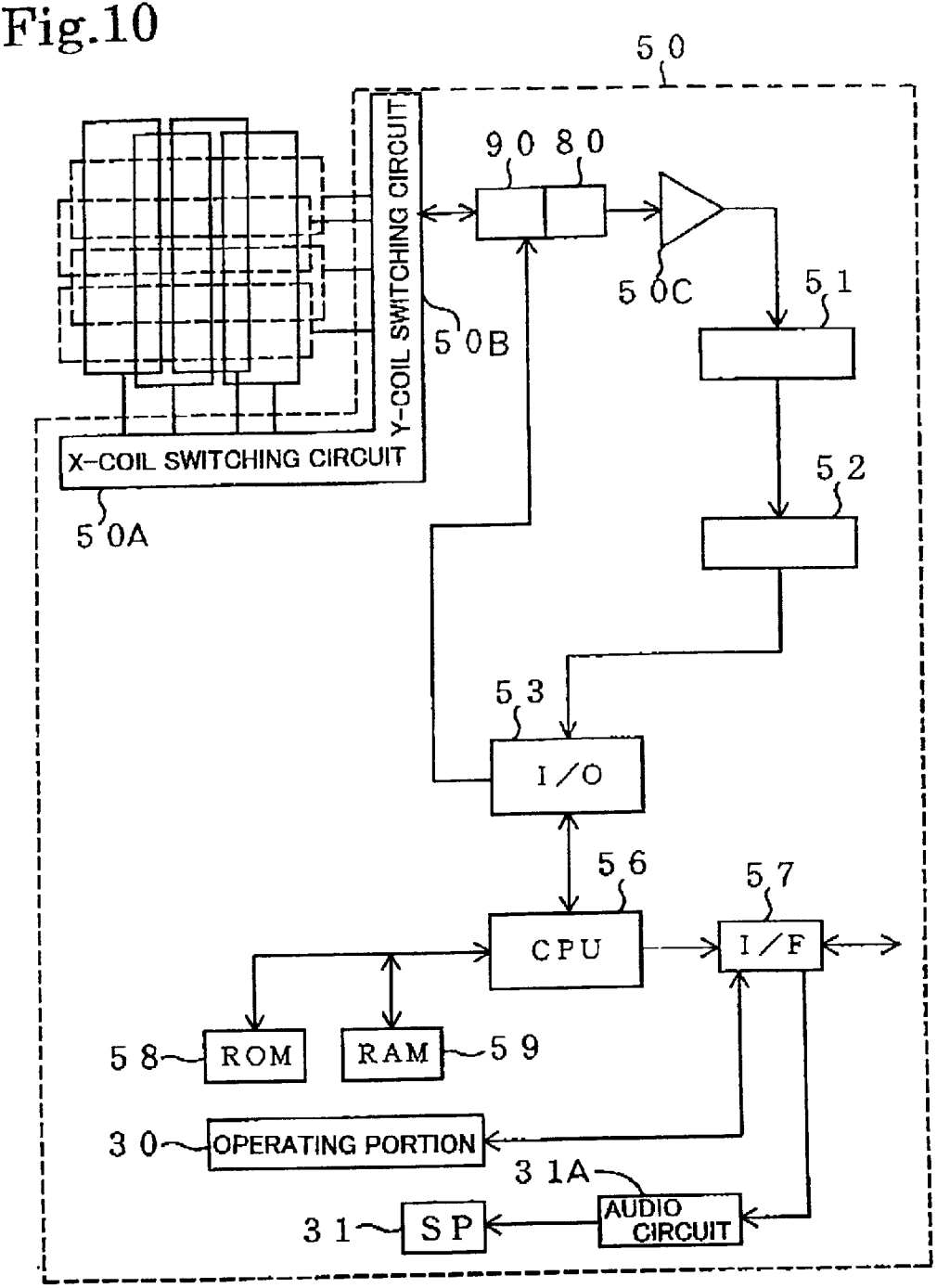
FIG. 10 is a block diagram of the tablet.
Figure 11:
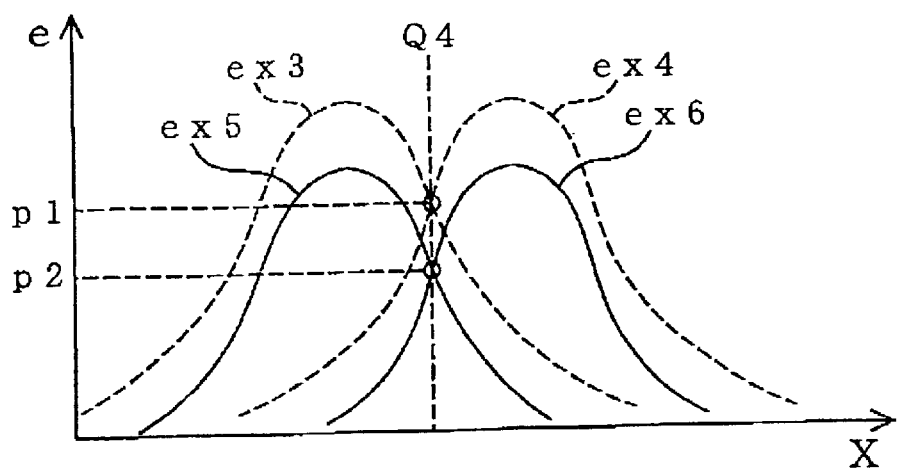
FIG. 11A is a plot of detected voltage of the X-coils when the adjacent X-coils
FIG. 11B partially shows the memory contents in a RAM.
FIG. 11C schematically illustrates the memory contents in a temporary memory of FIG. 11B.
Figure 12:
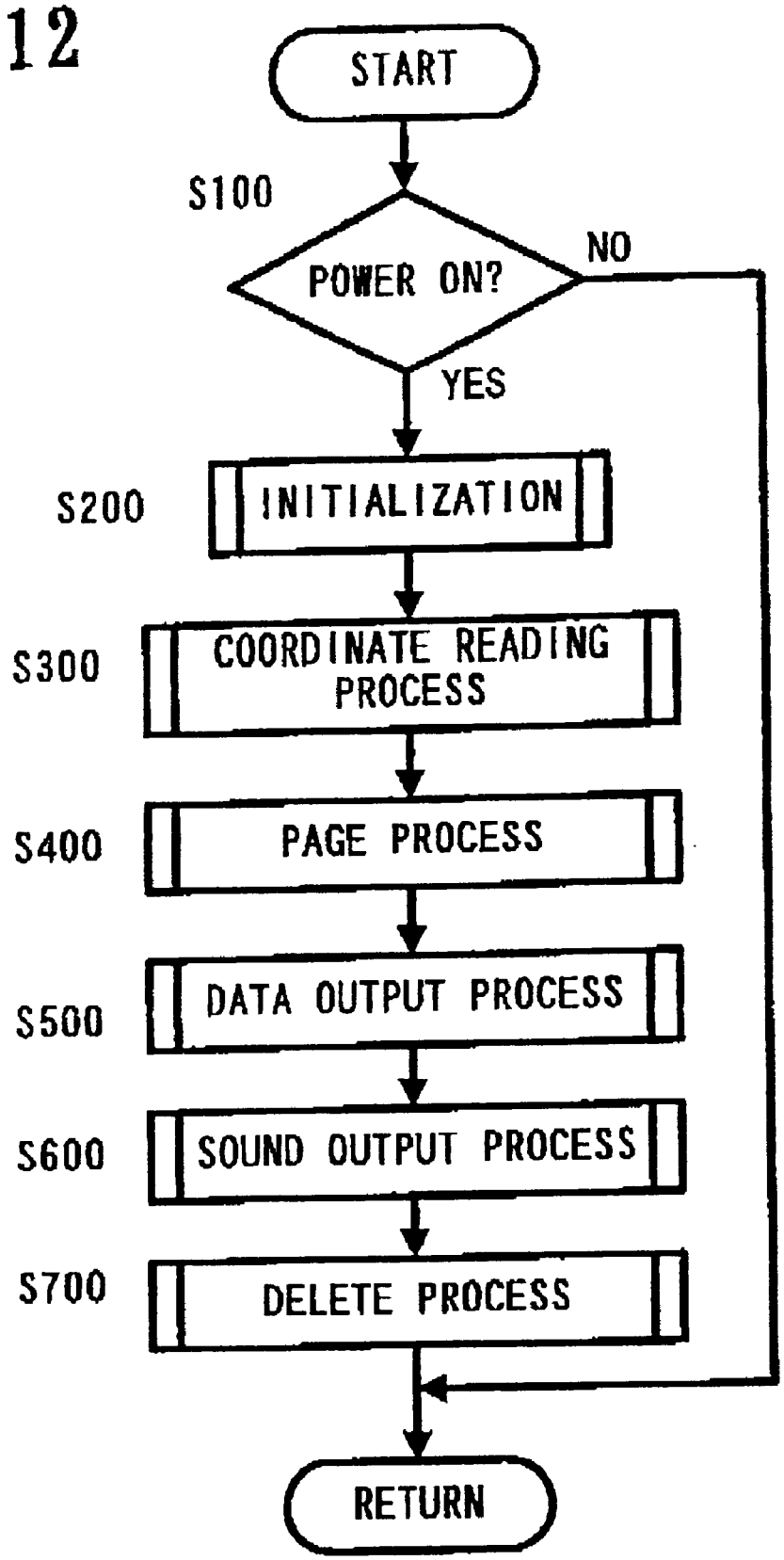
FIG. 12 is a flowchart for a control program executed by a CPU of FIG. 10.
Figure 13:
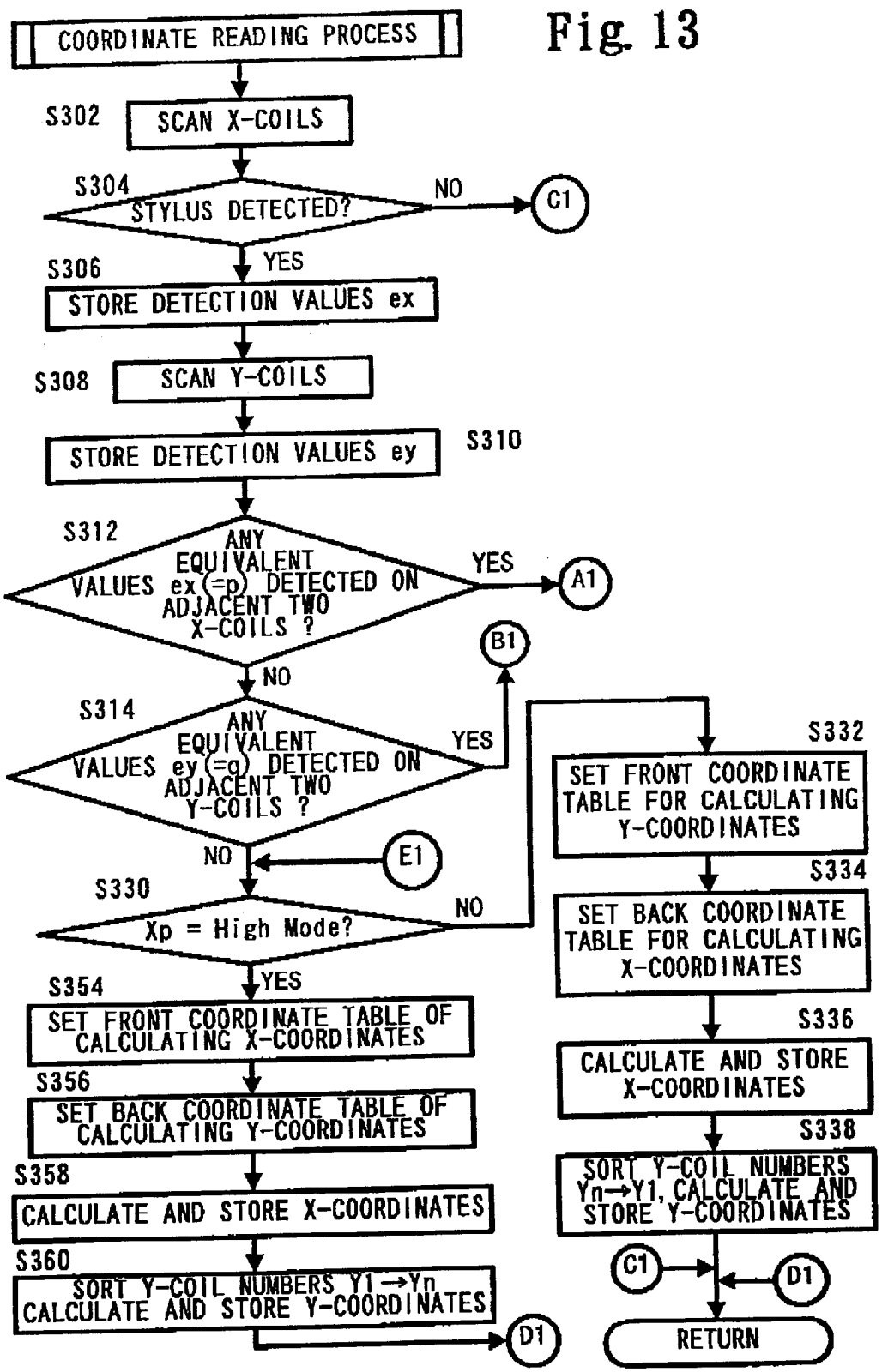
FIG. 13 is a flowchart of a coordinate reading process performed by the CPU.
Figure 14:
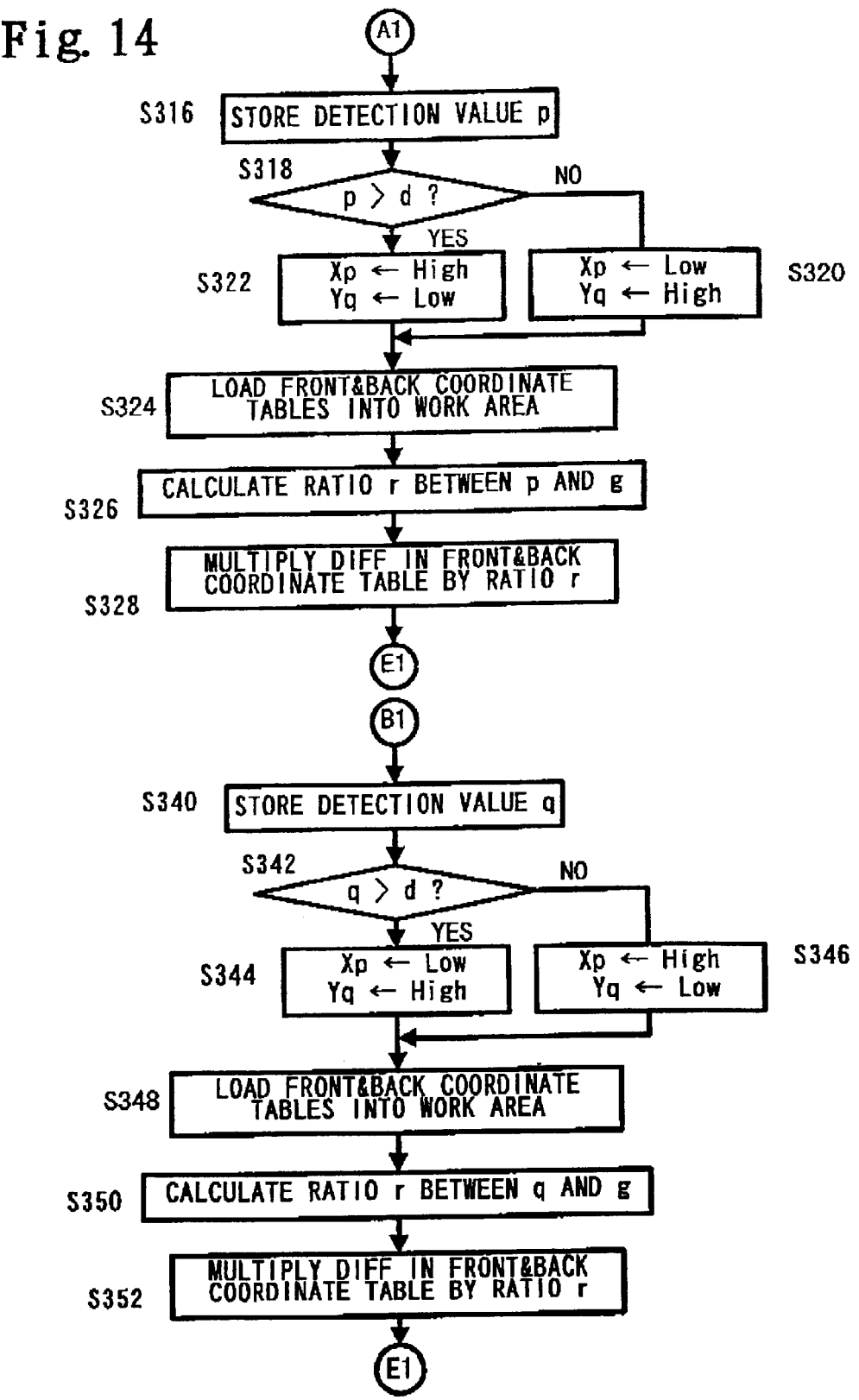
FIG. 14 is a follow-up of the flowchart of FIG. 13.

FIG. 10 is a block diagram of the tablet 1. FIG. 11A shows voltages detected on the adjacent two coils that are substantially equivalent. FIG. 11B partially shows the memory contents in a RAM 59, and FIG. 11C shows the memory contents in a temporary memory of the RAM 59. FIG. 12 is a flowchart for a control program of the CPU 56 of FIG. 10. FIG. 13 is a flowchart of a coordinate reading process performed by the CPU 56, and FIGS. 14A and 14B are a follow-up of the flowchart of FIG. 13.

As shown in FIG. 10, the tablet 1 includes a control device 50 and a ROM 58. The control device 50 has the X-coil switching circuit 50A that switches X-coils from X1 to Xm in sequence, and the Y-coil switching circuit 50B that switches Y-coils from Y1 to Yn in sequence. Both of the switching circuits 50A and 50B switch the coils with switching elements, such as a transistor (for example, MOS FET). The ROM 58 stores various control programs that are performed by the CPU 56, and the positional coordinate table 58A (shown in FIG. 8A).

When the CPU 56 detects that the tablet 1 is switched on at the push of the power button 38 in step S100, the CPU 56 executes initialization in step S200. In the initialization, the various control programs and the positional coordinate tables are loaded into a work area of the RAM 59. Then, the CPU 56 performs the coordinate reading process in step S300 to detect X- and Y-coordinates of the stylus 60 on the input plane 21A or 21B, and to store data of the detected X- and Y-coordinates of the stylus 60. A set of the X- and Y-coordinates of the stylus 60 that is successively determined constitutes input data indicative of an image (characters and/or figures) drawn on the input plane 21A and/or 21B. The coordinate reading process of step S300 is repeated when a plurality of images is inputted. The CPU 56 ends the coordinate reading process, when the stylus 60 is not detected by any sense coil, and proceeds to page process in step S400. In the page process, the CPU 56, for instance, pages up, pages down or erases the input data by a page. In step S500, the CPU performs a data output process to convert the input data of the user's desired page into an appropriate format, and to output the resultant data to the PC 100 or the printer. In step 600, the CPU 56 performs sound output process for generating operational sounds by operating a sound circuit 31A in response to the switching signals. Next, the CPU 56 proceeds to delete the process in step S700 to erase the input image and the corresponding input data indicative of the erased image.

One series of processes represented by the flowchart of FIG. 12 are completed, when the CPU 56 finishes the delete process of step S700, and then, the tablet 1 is switched off. The next time that the tablet 1 is used, the CPU 56 starts the control program from step S100 to step S700.

Figure 6:
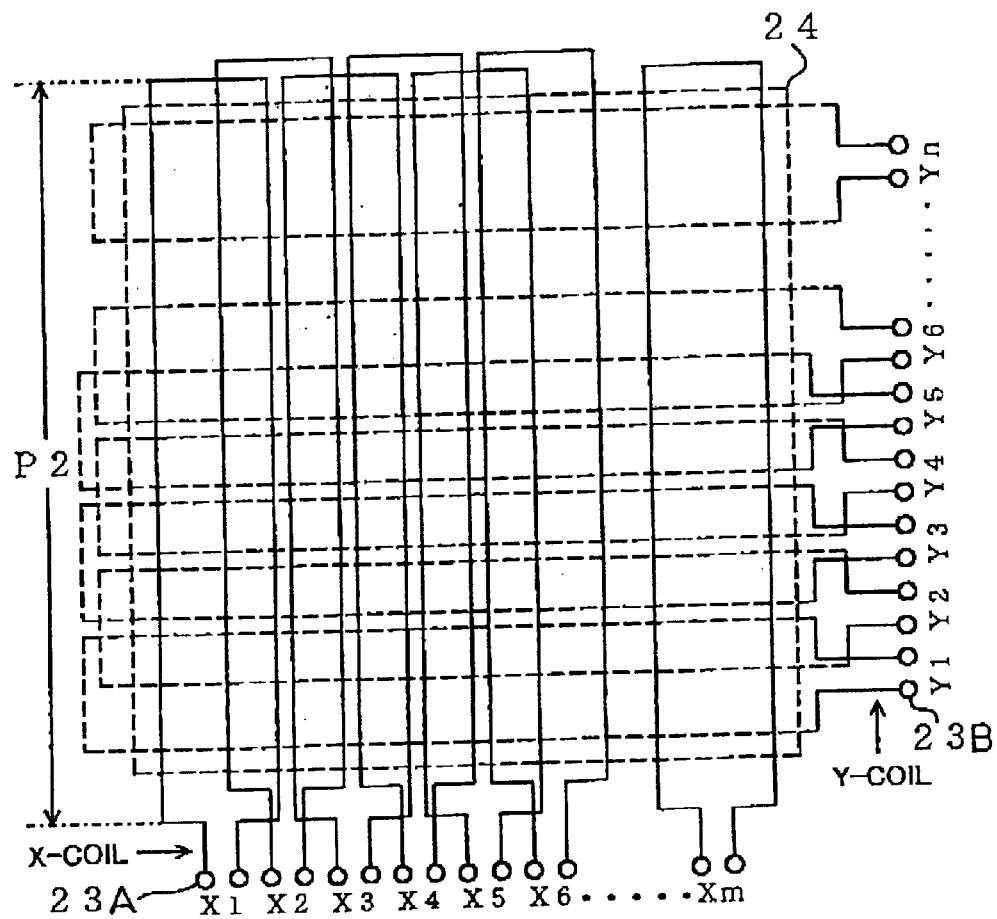
FIG. 6A schematically illustrates X-coils and Y-coils provided in the input panel of FIG. 5.
FIG. 6B is an explanation drawing a width of the X-coil and an overlapping pitch between the X-coils.
Figure 6:
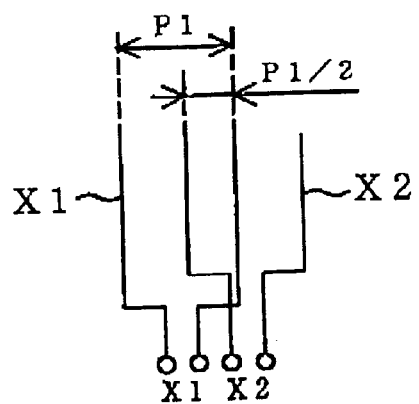

The coordinate reading process of step S300 will be described below, assuming that the input plane 21B is used first (that is, the stylus 60 is firstly placed on the input plane 21B). Herein, data Xp and Yq represent the input planes 21A and 21B, respectively. The input plane is placed in High mode, while in use. The input plane is placed in Low mode, while not in use. When Xp is placed in High mode, the Y-coils Y1 to Yn are arranged from bottom to top as shown in FIG. 6. When Yq is placed in High mode, the Y-coils Y1 to Yn are arranged from top to bottom. (The former arrangement is referred to as a normal arrangement, and the latter is referred to as a reverse arrangement.)

In the initialization (step S200), Xp and Yq is placed in High mode and Low mode, respectively.

In step S302, the CPU 56 controls the X-coil switching circuit 50A to scan the X-coils. At this time, the stylus 60 generates alternate magnetic field to form electromagnetic coupling with the X-coils, thereby generating signals on each X-coils. The signals are amplified by an amplifier 90, filtered by a band-pass filter 80, and detected by an amplitude detector 51. Then, the detected signals are converted into digital signals by an A/D converter 52 in correspondence with the amplitude of the signals, that is, the voltages on the X-coil. The digital signals are input into the CPU 56 via an I/O circuit 53. The CPU 56 detects the stylus 60 upon receipt of the signals in step S304. The CPU 56 stores, in step S306, detection values ex (e1 to em) indicated by the digital signals in the temporary memory 59A of the RAM 59 with respect to the coil numbers of the X-coils, as shown in FIG. 11C.

In the same way, the CPU 56 controls the Y-coil switching circuit 50B to scan the Y-coils in step S308, and stores detection values ey (e1 to en) in a temporary memory 59A of the RAM 59 with respect to the coil numbers of the Y-coils in step S310.

In step S312, the CPU 56 determines whether there are equivalent detection values (referred to as p) detected on the adjacent two X-coils among the detection values ex stored in the RAM 59. If yes in step S312, the value p is temporarily stored in the RAM 59 in step S316. The value p corresponds to a detection value ex detected at a midpoint between the overlapping area of the adjacent two X-coils.

Then, the CPU 56 determines in step S 318 whether the value p is larger than a predetermined value d previously stored in the ROM 58.

As mentioned above, the strength of the alternating magnetic field becomes lower with the distance from the stylus 60. The nearer the sense coils are to the stylus 60, the larger detection values detected on those sense coils. When the stylus 60 is placed on the input plane 21A, the detection value detected at the midpoint of the overlapping area of the adjacent two X-coils (that is, p) is larger than the detection value detected at the midpoint of the overlapping area of the adjacent two Y-coils (that is, q). If the value d is defined as an intermediate value between such detection values p and q and if the stylus 60 is placed on the input plane 21A, p is larger than d. In such a case, if the X-coils are nearer from the stylus 60 than the Y-coils, (that is, the stylus 60 is placed on the input plane 21A), the value p is larger than the value d. On the other hand, if the X-coils are farther away from the stylus 60 than the Y-coils, (that is, the stylus 60 is placed on the input plane 21B), p is smaller than d. In this way, it is determined which of the input planes the stylus 60 is placed on, by comparing p and d.

As it is now assumed that the stylus 60 is placed on the input plane 21B, the CPU 56 determines that the value p is smaller than the value d (No in step S318). As a result, Xp and Yq is changed to Low mode and High mode, respectively. In other words, it is detected that the input plane 21B is in use.

Then, the CPU 56 loads the front coordinate table 58A and the back coordinate table (second coordinate table) into the work area of the RAM 59 in step S324.

The detection values on the X- and Y-coils decrease in response to the battery drop of the stylus 60. For instance, the detection value p decreases from p1 to p2 in response to the battery drop of the stylus 60, as shown in FIG. 11A. This may cause the tablet 1 to detect incorrect X- and Y-coordinates undesirably. In order to detect X- and Y-coordinates accurately at any time, the CPU 56 calculates a ratio r of the value p to a reference value g stored previously in the ROM 58 in step S326, and multiplies each DIFF in the front and the back coordinate tables by the ratio r in step S328. By this, it is possible to correct the positional coordinate tables in response to voltage drop of a built-in battery of the stylus 60, thereby obtaining corrected coordinate tables. Herein, the reference value g may correspond to an equivalent detection value on the adjacent coils when the battery of the stylus 60 is not exhausted. In the example shown in FIG. 11A, when the stylus 60 is located at a position Q4, the voltages detected on the X-coils X5 and X6 are equivalent as a detection value p2. The detection values ex have been stored in the temporary memory 59A in correspondence with the coil numbers of the X-coils, as shown in FIG. 11C. If the value p2 is 128 and the reference value g is 256, the ratio r is calculated as r=p2/g=128/256= 0.5. The positional coordinate table 58A is multiplied by the ratio=0.5, thereby obtaining a corrected coordinate table 58B in which each DIFF is corrected to half its original value. Herein, each DIFF in the corrected coordinate table 58B is rounded off to the nearest integer.

When the positional coordinate tables are newly loaded into the work area of the RAM 59, the tables previously stored are abandoned to avoid repeating the above-mentioned correction.

Then, the CPU 56 determines whether Xp is in High mode in step S330. In this case, Xp has been converted to Low mode in step S320 (namely, No in step S330). Thus, the front coordinate table is set to the input plane 21B in step S332, and the back coordinate table is set to the input plane 21A in step S334.

Next, the CPU 56 computes X-coordinates and stores them in a back coordinate memory 59C in step S336. The CPU 56 also computes the Y-coordinates and stores them in a front coordinate memory 59B in step S338. In this case, the Y-coils are in the reverse arrangement, because the input plane 21B is in use. Thus, the CPU 56 sorts the coil numbers of the Y-coils in reverse order, before computing the Y-coordinates. This prevents the Y-coordinates from being reversed.

Now, the calculation process of the X- and the Y-coordinates will be explained, taking an example of computing the X-coordinates.

Firstly, the CPU 56 selects a maximum detection value e(max) among the detection values e1 to em stored in the temporary memory 59A, and stores its coil number (max) in the RAM 59. For instance, when the stylus 60 is located at a position Q3, as shown in FIG. 7A, the voltages e1, e2 and e3 are detected on the X-coils X1, X2 and X3, respectively, as shown in FIG. 7B. Thus, the CPU 56 select e(max)=e2, and stores its coil number (max)=2 in the RAM 59.

Then, the CPU 56 determines a second maximum detection value e(max2) among e(max±1) generated on the X-coils (max±1) adjacent to X(max), and stores its coil number (max2) in the RAM 59. In FIG. 7B, the CPU 56 select e(max2)=e3, and stores its coil number (max2)=3 in the RAM 59.

The CPU 56 compares the coil numbers (max) and (max2), and determines whether (max2) is larger or smaller than (max), that is, whether (max2) is in the positive direction or in the negative direction relative to X(max). If (max2) is equal to or is larger than (max), a variable SIDE is set to +1. If (max2) is smaller than (max), the variable SIDE is set to −1. Here, the variable SIDE is set to +1, because (max) and (max2) are 2 and 3, respectively, as shown in FIG. 7B.

Next, the CPU 56 calculates the voltage difference DIFF by subtracting e(max2) from e(max). The CPU 56 searches a DIFF in the positional coordinate table that is closest to the calculated DIFF, and sets the DIFF in the positional coordinate table as OFFSET. Then, the CPU 56 calculates the X-coordinate X1 in step S338 by the following equation.

$$X1 = (P1/2) \times (max) + OFFSET \times SIDE$$

In the equation, P1/2×(max) indicates a X-coordinate of the center line of the X-coil whose number is (max).

Figure 7:
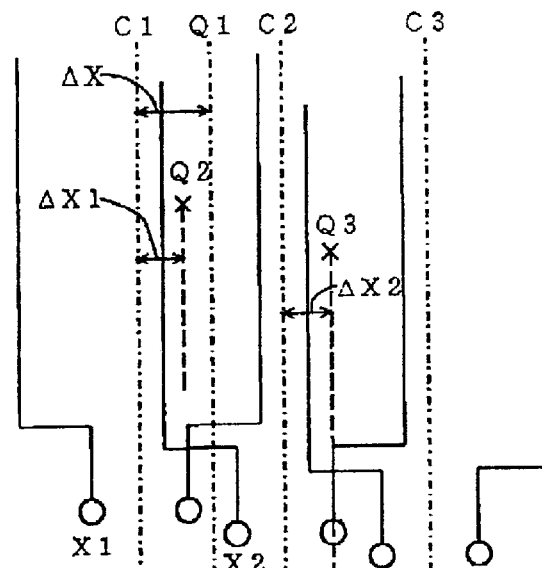
FIG. 7A is a partial view of X-coils X1, X2 and X3.
FIG. 7B is plots of voltages generated on the X-coil, X1, X2 or X3, relative to a distance in a width direction of the X-coil.
FIG. 7C is a plot of the voltage difference between the adjacent coils among X1, X2 and X3.
Figure 7:
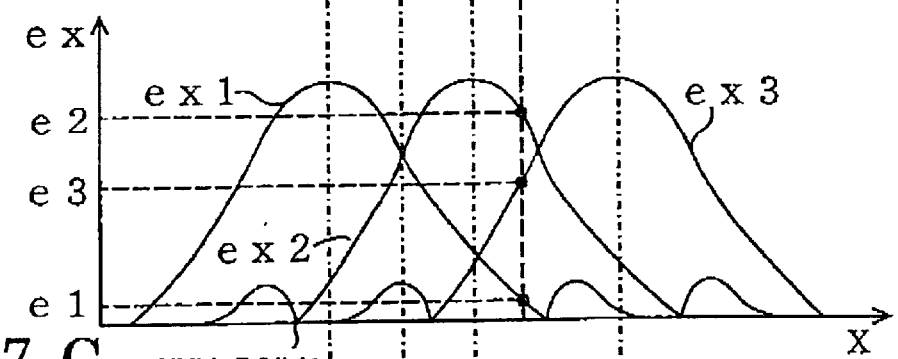
Figure 7:
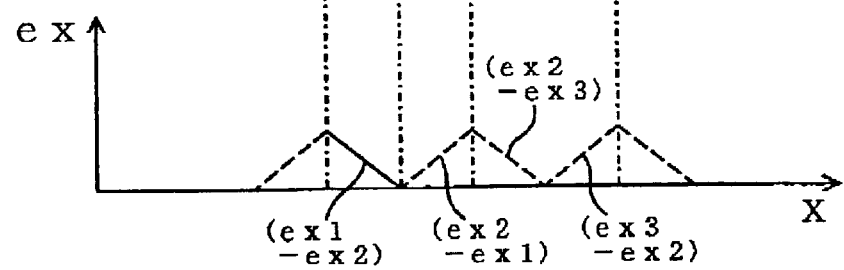
Figure 8:
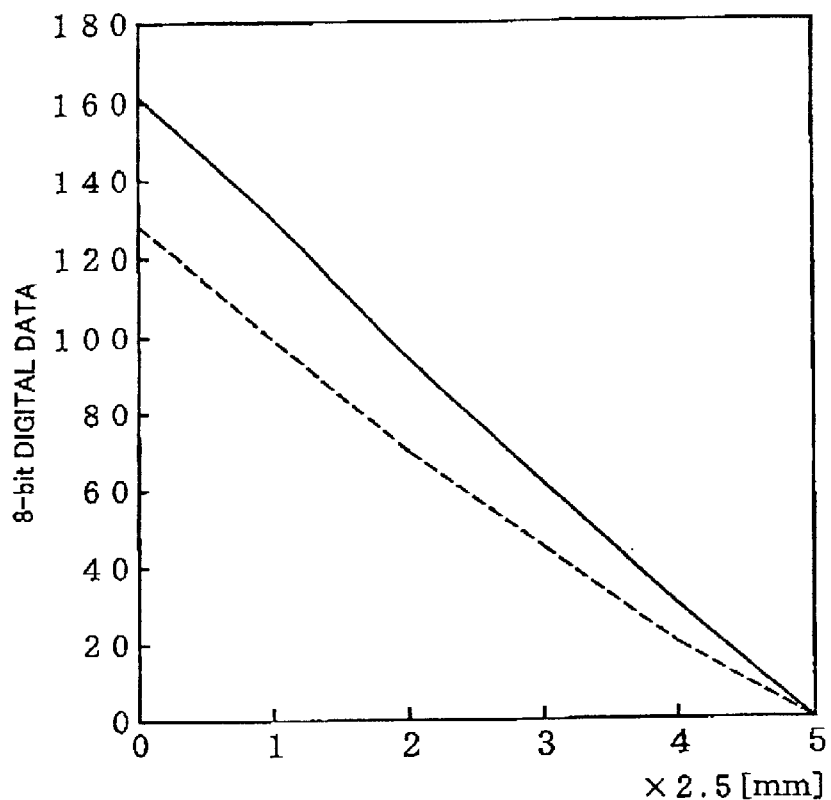
FIG. 8A is a plot of digital data indicative of the voltage difference between the adjacent coils.
FIG. 8B shows a positional coordinate table.
FIG. 8C shows a corrected positional coordinate table.

In the example shown in FIG. 7, the X coordinate of the point Q3 is calculated as X1=(P1/2)×2+(e2−e3)×(+1). Thus, the X-coordinate of the point Q3 is at a distance ΔX2 corresponding to (e2−e3) from the center line C2 in the positive direction of X-coordinates.

In another example shown in FIG. 11C, both of the X-coils X5 and X6 indicate e(max)=128, thereby leading DIFF=0 and OFFSET=12.5 with the use of the second positional coordinate table. If it is given (max)=6 and (max2)=5, SIDE is set to −1. Thus, the X-coordinate is calculated as X1=(P1/2)×6+12.5×(−1). In this embodiment, the X-coils of the width P1=50 mm are overlapped with the pitch P1/2. That is, the X-coordinate is expressed as X1=(P1/2)×6−P1/4. It means that the X-coordinate is at the midpoint of the overlapping area of the X-coils X5 and X6.

The input panel 20 may be turned over to use the input plane 21A after the input plane 21B. In such a case, the CPU 56 determines, in step S318, that the detection value p is larger than the predetermined value d (Yes in step S318), and changes Xp and Xq to High mode and Low mode, respectively, in step S322. Then, the CPU 56 corrects the positional coordinate tables in steps S324 to S328.

In step S330, the CPU 56 determines that Xp is High mode (Yes in step S330), thereby setting the front coordinate table to the input plane 21A in step S354, and setting the back coordinate table to the input plane 21B in step S356. The CPU 56 computes the X-coordinates and stores them in the front coordinate memory 59B in step S358. The CPU 56 next computes the Y-coordinates and stores them in the back coordinate memory 59C in step S360. As the Y-coils Y1 to Yn are in normal arrangement in this case, the coil numbers of the Y-coils are not sorted.

If yes in step S314, the value q is temporarily stored in the RAM 59 in step S340. Then, the CPU 56 determines in step S344 whether the value q is larger than the predetermined value d. If Yes in step S344, Xp and Yq is changed to Low mode and High mode, respectively. If No in step S344, Xp and Yq is changed to High mode and Low mode, respectively. In steps S348 to S352, the front and back coordinate tables are corrected in the same procedure as steps S324 to S328 as described above, wherein the ratio r of the detection value q to the reference value g is calculated in step S350.

If there is no detection of both of p and q (No in steps S312 and S314), the modes of Xp and Yq are maintained as set in the preceding coordinate reading process. The modes of Xp and Yq are changed at the time of detecting p or q.

The coordinate reading process of step S300 is repeated if a plurality of images is input on one input plane. If the coordinate reading process is repeated, it is not necessary to correct the positional coordinate table by calculating the ratio r, as long as the same detection value p and/or q is detected as the one in the preceding coordinate input process. In such a case, the positional coordinate table is maintained as corrected in the preceding coordinate reading process. The modes of Xp and Yq may also maintained as set in the preceding coordinate reading process.

As described above, the tablet 1 according to the first embodiment of the invention detects which of the input planes is in use upon the comparison of the detection value on the coil and the predetermined value, without using any mechanical switches. In the above embodiment, the predetermined value corresponds to an intermediate value between p and q, and can be represented by the following equation: e=(p+q)/2. Further, the value p and q may be corrected in some way, before comparing d with p or q, in response to a battery drop of the stylus, thereby determining which of the input planes the stylus is placed on.

A tablet 1 of a second embodiment will be described below, wherein like parts and components are designated by the same reference numerals to avoid duplicating description.

The tablet 1 of the second embodiment is the same as the tablet 1 of the first embodiment, but is characterized in that the tablet 1 of the second embodiment detects, with high reliability, which of the input planes is in use, even if the input panel 20 is relatively thin. When the input panel 20 is relatively thin, it is not easy to detect a difference of the magnetic field strength between the input planes 21A, 21B. In such a case, it may be difficult to determine which of the input planes is in use upon the comparison of the detection value p (or q) and the predetermined value d in the same way as the first embodiment. According to the second embodiment, the tablet 1 detects which input plane is in use based upon the comparison of the detection values p and q.

Figure 15:
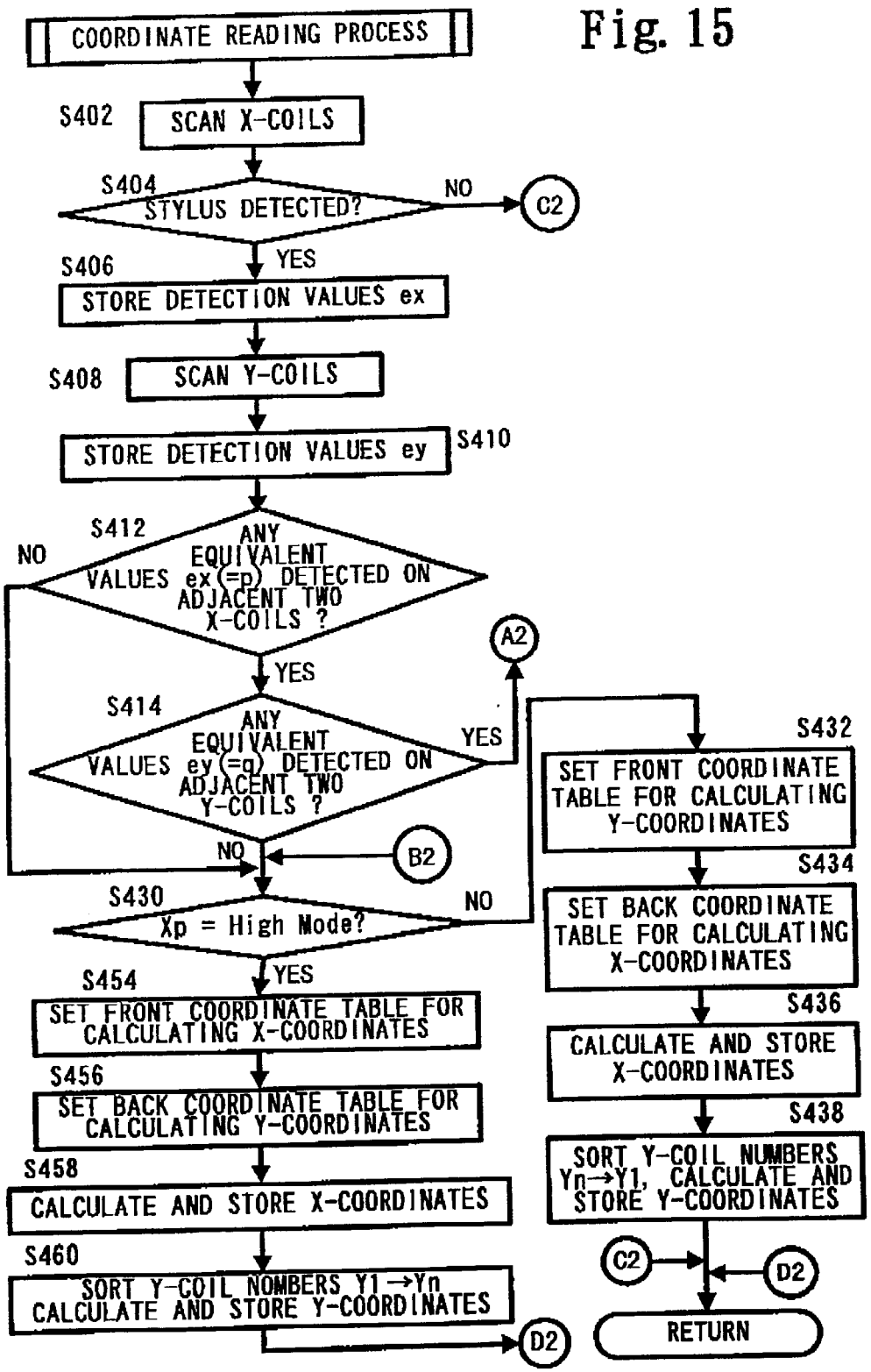
FIG. 15 is a flowchart of a coordinate reading process executed by a tablet according to a second exemplary embodiment of the invention.
Figure 16:
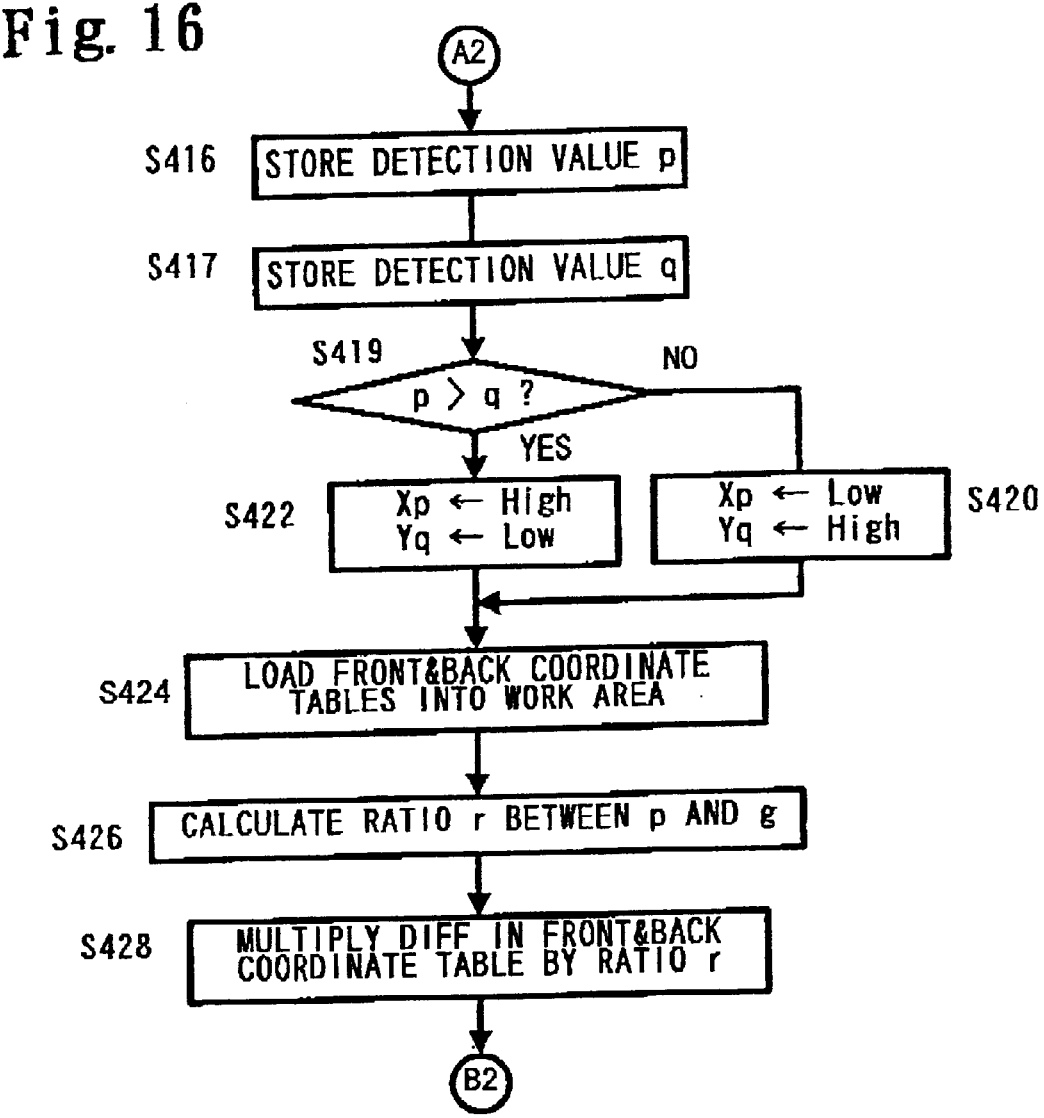
FIG. 16 is a follow-up of the flowchart of FIG. 15.

FIG. 15 is a flowchart showing a coordinate reading process performed by a CPU 56, and FIG. 16 is a follow-up to the flowchart of FIG. 15. Herein, it is assumed that the input plane 21-B is used first.

The CPU 56 performs the steps S402 to S410 in a manner similar to the first embodiment. Then, the CPU 56 determines, in step S412, whether any adjacent two X-coils detect the equivalent detection value p among the detection values ex stored in the RAM 59. If yes in step S412, the CPU 56 determines, in step S414, whether any adjacent two Y-coils detect the equivalent detection value q among the detection values ey stored in the RAM 59. If yes in step S414, the detection values p and q are temporarily stored in the RAM 59 in steps S416 and S418, respectively, as shown in FIG. 16. The CPU 56 determines whether the value p is larger than the value q in step S419. As described above, the strength of the alternating magnetic field becomes lower with the distance from the stylus 60. The nearer the sense coils are to the stylus 60, the larger detection values are detected on those sense coils. In this case, it is determined that the value p is smaller than the value q (No in step S419), because the stylus 60 is placed on the input plane 21B and the Y-coils are nearer to the stylus 60. As a result, Xp and Yq is changed to Low mode and High mode, respectively, in step S420. The CPU 56 performs the steps S424 to S428, in a manner similar to the first embodiment, to correct the front and back coordinate tables. As it has been determined that Xp is Low mode in step S320, it leads to No in step S430. The CPU 56 performs the steps S332 to S338, in a manner similar to the first embodiment, to sense the X- and Y-coordinates and to store them in the back and the front coordinate memories.

If the input plane 21A is used, the CPU 56 determines that the value p is larger than the value q (Yes in step S419). Then, Xp and Yq is changed to High mode and Low mode, respectively, in step S422. The CPU 56 corrects the front and the back coordinate tables in steps S424 to S428, and computes the X- and Y-coordinates and stores them in the front and the back coordinate memories in steps S454 to S460.

If both p and q are not detected (No in steps S412 and S414), the modes of Xp and Yq are maintained as set in the preceding coordinate reading process. The modes of Xp and Yq are changed at the time of detecting p and q.

As described above, the tablet 1 according to the second embodiment of the invention detects the input plane in use with high reliability upon the comparison of the detection values p and q.

A tablet 1 of the third embodiment will be described below referring to FIG. 17.

The tablet 70 of the third embodiment is the same as the tablets 1 of the first and second embodiments, except that the tablet 70 of the third embodiment has a shield plate to shield against noise from outside sources. This allows the tablet 70 to prevent interference in reading coordinates due to the noise.

Figure 17:
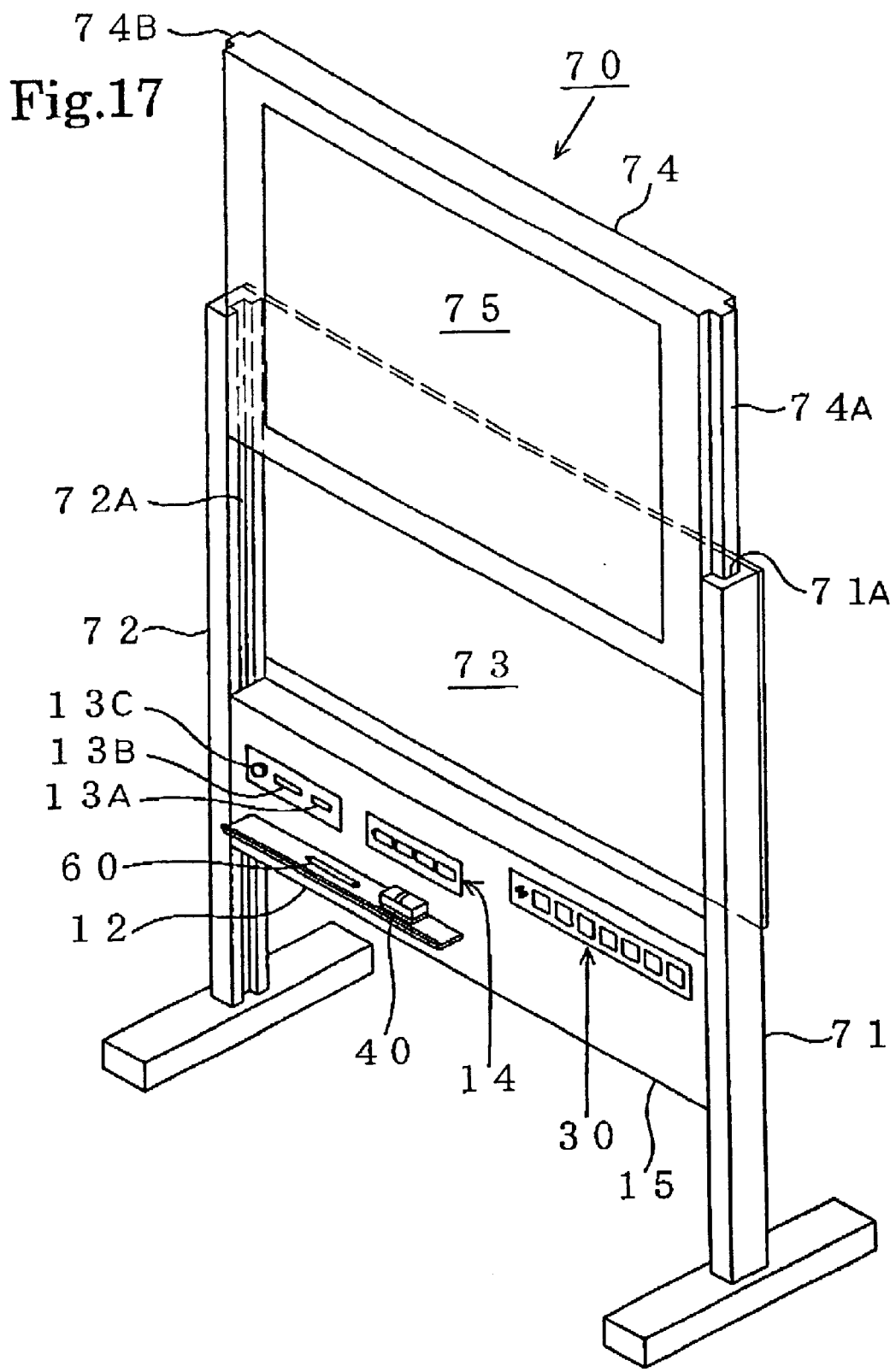
FIG. 17 is a perspective view of a tablet according to a third embodiment of the invention.
Figure 18:
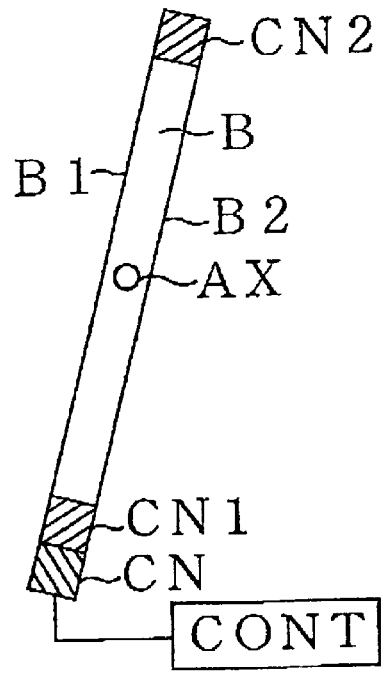
FIGS. 18A and 18B respectively illustrates a board B of a coordinate reader when a coordinate input sheet B1 and a coordinate input sheet B2 are in use.
Figure 18:
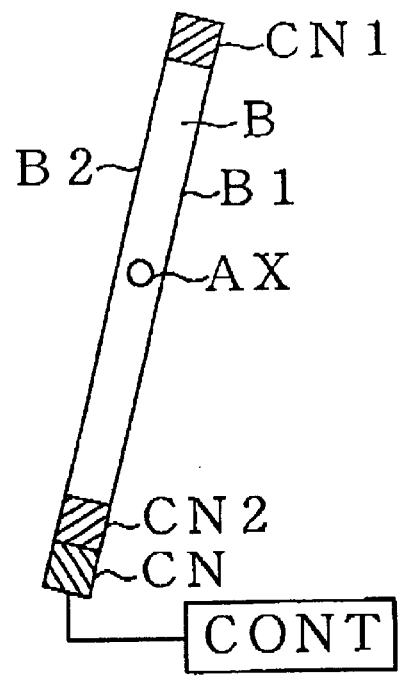

FIG. 17 is a perspective view of a tablet 70 according to the third embodiment of the invention. The tablet 70 comprises columns 71, 72 for supporting the tablet 70, and an input panel 74. The input panel 74 has input planes 75 on its both sides and protrusions 74A and 74B on its lateral sides. The columns 71, 72 have grooves 71A, 72A, respectively, to engage with the protrusions 74A, 74B for supporting the input panel 74. In other words, the input panel 74 is vertically slidable along the columns 71, 72. The input panel 74 is slid upward and dismounted from the columns 71, 72 to be turned over.

Further, the shield plate 73 is attached to the columns 71, 72 in the back of the input panel 74. The shield plate 73 is required to have a size large enough to cover the entire back side of the input panel 74. In this embodiment, the shield plate 73 is made of a conductive material, such as aluminum, to be 1.0 mm thick.

The tablet 70 is able to determine which input plane is in use, and to sense the X- and Y-coordinates of the stylus 60, in the same way as the tablets 1 of the first and the second embodiments.

The input plane 74, when dismounted from the columns 71, 72, is allowed to be turned over in any direction (for example, vertically or laterally). However, if the input plane 74 is mounted to the columns 71, 72 in any orientation, it is difficult to determine whether the coil numbers need to be sorted during the above-mentioned computing process of the X- and Y-coordinates. Therefore, it is preferable to predetermine the orientation in which the input panel 74 is mounted.

Although the invention has been described referring to preferred embodiments, it is evident that many alternatives, modifications and variations may be apparent to those skilled in the art. Accordingly, the preferred exemplary embodiments of the invention as set forth herein are intended to be illustrative, not limiting. Various changes may be made without departing from the spirit and scope of the invention as defined in the following claims.

For example, the tablet may provide an indication of battery exhaustion of the stylus, when the ratio r between the detection value p or q and the reference value g is smaller than a designated value. The tablet could provide such an indication by lighting up the LED or LCD, or a warning from the speaker.

Further, though it is determined which of the input planes is in use by using the equivalent detection value p and q detected on the adjacent two sense coils in the above embodiments, it is possible to determine which of the input planes is used by using other detection values. For example, a maximum detection value, which is detected on the center line of any one of the X- and Y-coils, may be used to determine which of the input planes the stylus is placed on for inputting.

What is claimed is:

1. A coordinate reader for detecting coordinates designated by an alternating magnetic field, comprising:
   a base member comprising:
      a first side including a first loop wire that generates a first signal in response to the alternating magnetic field, and a first input plane;
      a second side including a second loop wire that generates a second signal in response to the alternating magnetic field, and a second input plane;
   a signal detection unit that detects the first and the second signals;
   an input plane determination unit that determines from which of the first input plane or the second input plane the coordinates are designated by the alternating magnetic field by using at least one of the first and the second signals; and
   a coordinate determination unit that determines a first coordinate and a second coordinate that are designated by the alternating magnetic field based on the detected first and second signals, respectively.

2. The coordinate reader of claim 1, wherein the base member further comprises a plate dividing the base member into the first side and the second side.

3. The coordinate reader of claim 2, wherein the base member has a plurality of first loop wires and a plurality of second loop wires, wherein the signal detection unit has a first signal level detector detecting a first signal level and a second signal level detector detecting a second signal level, the first signal level being the levels of the signals that are substantially equivalent on any adjacent two first loop wires among the plurality of the first loop wires, the second signal level being the levels of the signals that are substantially equivalent on any adjacent two second loop wires among the plurality of the second loop wires, and wherein the input plane determination unit determines from which of the first input plane or the second input plane the coordinates are designated by the alternating magnetic field by using at least one of the first signal level and the second signal level.

4. The coordinate reader of claim 3, wherein the input plane determination unit compares the first signal level and the second signal level, and determines, upon the comparison of the first signal level and the second signal level, from which of the first input plane or the second input plane the coordinates are designated by the alternating magnetic field.

5. The coordinate reader of claim 3, wherein the input plane determination unit stores a predetermined signal level, compares the reference level with one of the first signal level and the second signal level, and determines, upon the comparison of the predetermined signal level with one of the first signal level and the second signal level, from which of the first input plane or the coordinates are designated by the alternating magnetic field.

6. The coordinate reader of claim 5, wherein the predetermined signal level corresponds to an intermediate value between the first signal level and the second signal level.

7. The coordinate reader of claim 3, further comprising a correction unit that corrects at least one of the first coordinates and the second coordinates, upon the determination of the input plane by the input plane determination unit.

8. The coordinate reader of claim 2, further comprising a shielding member that shields one of the first input plane and the second input plane against noise from outside sources.

9. The coordinate reader of claim 1, wherein the first loop wire and the second loop wire is a copper wire covered with an insulating layer.

10. The coordinate reader of claim 2, wherein the base member is made of a foam material, the plate is made from either acrylic resin, ABS, or PC, and the first and second input plane is made of PET.

11. The coordinate reader of claim 1, wherein the first and second signals are amplified by an amplifier, filtered by a band-pass filter and detected by an amplitude detector in the signal detection unit.

12. A method for detecting a coordinate designated by an alternating magnetic field on one of a plurality of input planes provided in a coordinate reader, comprising the steps of:
   generating a signal in response to the alternating magnetic field;
   detecting the signal;
   determining, based on the detected signal, from which of the coordinate input planes the coordinate is designated by the alternating magnetic field; and determining, based on the signal, the coordinates designated by the alternating magnetic field on the determined input plane.

13. The method of claim 12, wherein the signal is generated by generating a first signal in response to the alternating magnetic field by a first loop wire and generating a second signal in response to the alternating magnetic field by a second loop wire.

14. The method of claim 13, wherein the designated coordinate input plane is determined by a first signal level detector detecting a first signal level and a second signal level detector detecting a second signal level, the first signal level being the levels of the signals that are substantially equivalent on any adjacent two first loop wires among the plurality of first loop wires and the second signal level being the level of the signals that are substantially equivalent on any adjacent two second loop wires among the plurality of second loop wires.

15. The method of claim 14, wherein the designated coordinate input plane is determined by comparing the first signal level and the second signal level and determining upon a comparison of the first signal level and the second signal level, from which of the coordinate input planes is designated by the alternating magnetic field.

16. The method of claim 14, wherein the designated coordinate input plane is determined by comparing a reference level with one of the first signal level and the second signal level and determining upon a comparison of the predetermined signal level which one of the first signal level and the second signal level, from which of the coordinate input planes is designated by the alternating magnetic field.

17. The method of claim 16, wherein the predetermined signal level corresponds to an intermediate value between the first signal level and the second signal level.

18. The method of claim 17, further comprising the step of correcting the at least one of the first coordinates and the second coordinates upon the determination of the input plane by the input plane determination unit.

19. The method of claim 13, further comprising the step of shielding one of the first loop wire and the second loop wire against noise from outside sources.

20. A coordinate reader for detecting a coordinate designated by an alternating magnetic field on one of a plurality of input planes provided in a coordinate reader, comprising:

signal generating means for generating a signal in response to the alternating magnetic field;

signal detecting means for detecting the signal;

input plane determination means for determining, based on the detected signal, from which of the input planes the coordinate is designated by the alternating magnetic field;

coordinate determination means for determining, based on the detected signal, the coordinate designated by the alternating magnetic field on the determined input plane.

\* \* \* \* \*